US011424856B2

United States Patent
Ge et al.

(10) Patent No.: US 11,424,856 B2
(45) Date of Patent: Aug. 23, 2022

(54) ENCODING AND DECODING SOURCE INFORMATION USING A DISTRIBUTION CHANNEL ENCODER AND DECODER

(71) Applicants: Yiqun Ge, Kanata (CA); Wuxian Shi, Kanata (CA); Wen Tong, Ottawa (CA)

(72) Inventors: Yiqun Ge, Kanata (CA); Wuxian Shi, Kanata (CA); Wen Tong, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 89 days.

(21) Appl. No.: 16/929,477

(22) Filed: Jul. 15, 2020

(65) Prior Publication Data

US 2022/0021477 A1 Jan. 20, 2022

(51) Int. Cl.
*G11C 29/00* (2006.01)
*H04L 1/00* (2006.01)
*G06N 3/08* (2006.01)
*G06F 17/18* (2006.01)

(52) U.S. Cl.
CPC ............ *H04L 1/0041* (2013.01); *G06F 17/18* (2013.01); *G06N 3/08* (2013.01); *H04L 1/0045* (2013.01); *H04L 1/0076* (2013.01)

(58) Field of Classification Search
CPC ... H04L 1/0041; H04L 1/0045; H04L 1/0076; G06N 3/08; G06F 17/18
See application file for complete search history.

(56) References Cited

U.S. PATENT DOCUMENTS

2021/0351863 A1* 11/2021 Gunduz ............... G06N 3/0472

FOREIGN PATENT DOCUMENTS

CN 106203624 A 12/2016
WO 2019128781 A1 7/2019

OTHER PUBLICATIONS

Erdal Arikan et al, "Channel Polarization: A Method for Constructing Capacity-Achieving Codes for Symmetric Binary-Input Memoryless Channels", IEEE Transactions on Information Theory, vol. 55, No. 7, Jul. 2009, total 23 pages.
R4-1812723, OPPO, "Changes to FR2 UL MIMO", 3GPP TSG-RAN WG4 #88bis, Chengdu, China, Oct. 8-12, 2018, total 7 pages.

* cited by examiner

*Primary Examiner* — Samir W Rizk

(57) ABSTRACT

A method and apparatus for encoding source information for transmission over a transmission channel is disclosed. The method involves causing a source encoder to generate a plurality of feature probability distributions representing aspects of the source information. The method also involves receiving the plurality of feature probability distributions at an input of a distribution channel encoder, the distribution channel encoder being implemented using a polarization stream network. The method further involves causing the distribution channel encoder to transform the plurality of feature probability distributions into a dimension-extended output plurality of distribution codewords for transmission over the transmission channel. Methods and apparatus for decoding the output plurality of distribution codewords to regenerate the source information is also disclosed.

19 Claims, 9 Drawing Sheets

ENCODING AND DECODING SOURCE INFORMATION USING A DISTRIBUTION CHANNEL ENCODER AND DECODER

BACKGROUND

Field

This disclosure relates generally to wireless communications, and more specifically to encoding source information using a distribution channel encoder for transmission over a communications channel and decoding information received over the channel using a distribution channel decoder.

Description of Related Art

In wireless communication systems, information is encoded prior to transmission to guard against noise, distortion, and deterioration over wireless or wired transmission channels. A transmitter may encode k bits of source information into an n-bit codeword, by adding redundant bits in accordance with a pre-defined channel encoding scheme. The codeword is then modulated onto a waveform and transmitted over a transmission channel. The waveform is subjected to channel noise during transmission. A decoder receiving the noised codeword and having knowledge of the encoding scheme, is configured to decode the source information from the codeword, which has been subjected to noise and distortion.

Variational autoencoders (VAE) offer a promising method of encoding source information based on machine learning techniques. The VAE encoder outputs k features, each of which is a Gaussian distribution defined by an expectation value and a variance. A probabilistic VAE decoder recovers the source information from a k-value vector, including k samples with the expectation values and variance associated with the Gaussian distributions. In the case of a VAE, the assumption that each information bit is independent and identically distributed (i.i.d), would not apply. According to the i.i.d. assumption, if one bit in one block is decoded wrong, the entire block must be discarded and retransmitted. Rather than ensuring that each bit is correctly transmitted, the VAE causes the k-value vector to include samples within the Gaussian distribution that fall within the required expectations and variances.

Although the VAE may be implemented to improve performance, there remains a need for improvements to address some inefficiencies in conventional VAE encoding/decoding schemes.

SUMMARY

In accordance with one disclosed aspect there is provided a method for encoding source information for transmission over a transmission channel. The method involves causing a source encoder to generate a plurality of feature probability distributions representing aspects of the source information. The method also involves receiving the plurality of feature probability distributions at an input of a distribution channel encoder, the distribution channel encoder being implemented using a polarization stream network. The method further involves causing the distribution channel encoder to transform the plurality of feature probability distributions into a dimension-extended output plurality of distribution codewords for transmission over the transmission channel.

The source encoder may include a source encoder neural network, and the method may further involve training the source encoder neural network to generate the plurality of feature probability distributions in response to receiving a source information training set.

Training the source encoder neural network may involve configuring a source decoder neural network to receive the plurality of feature probability distributions from the source encoder neural network at an input of the source decoder neural network, and training the source encoder neural network and source decoder neural network to reproduce the source information training set at an output of the source decoder neural network.

The training may involve training the source encoder neural network and source decoder neural network to satisfy a first target of maximizing likelihood between the output of the source decoder neural network and the source information training set, and to satisfy a second target of minimizing relative entropy between the output of the source encoder neural network and a target distribution.

The target distribution may be a Gaussian distribution.

The Gaussian distribution may include a multi-dimensional Gaussian distribution and each feature probability distribution may include a vector of expectation values and variance values.

The source encoder may be implemented in a transmitter and the method may further involve transmitting configuration information to a receiver, the configuration information defining the source decoder neural network and facilitating configuration of a source decoder at the receiver for decoding subsequent transmissions from the transmitter.

Each feature probability distribution may include an expectation value and a variance value.

The method may involve training a neural network portion of the polarization stream network to configure the polarization stream network for performing the transformation between the feature probability distributions and output plurality of distribution codewords.

The output plurality of distribution codewords may include an output plurality of non-Gaussian distributions.

The source encoder may be configured to generate feature probability distributions having k dimensions and the polarization stream network may be configured to transform the k-dimensional feature probability distributions received at the input of the polarization stream network into an n-dimensional output plurality of distribution codewords, k being less than n, and training the neural network portion of the polarization stream network may involve causing excess input dimensions of the polarization stream network to be held constant to generate the dimension-extended n-dimensional output plurality of distribution codewords.

The distribution channel encoder may be implemented in a transmitter and the method may further involve transmitting configuration information to a receiver, the configuration information including an identification of the excess input dimensions and information facilitating configuration of a reverse polarization stream network for implementing a decoder at the receiver.

Training the neural network portion of the polarization stream network may involve causing a receiver to train a plurality of polarization stream network configurations and the method may further involve receiving one of the plurality of polarization stream network configurations at the transmitter for performing the transformation between the feature probability distributions and output plurality of distribution codewords.

The method may involve receiving the plurality of distributions representing the transmitted source information at an input of a distribution channel decoder in a receiver, the distribution channel decoder being implemented using a polarization stream network, causing the distribution channel decoder to transform the plurality of distributions into a dimension-reduced output plurality of feature distributions, and causing a source decoder to regenerate the source information from the output plurality of feature probability distributions.

In accordance with another disclosed aspect there is provided a method for encoding source information for transmission over a transmission channel. The method involves causing a first source encoder to generate a first plurality of feature probability distributions representing aspects of the source information. The method also involves rearranging the source information to generate transformed source information, and causing a second source encoder to generate a second plurality of feature probability distributions representing aspects of the transformed source information. The method further involves causing a first distribution channel encoder to transform the first plurality of feature probability distributions into a first dimension-extended output plurality of distribution codewords for transmission over the transmission channel. The method also involves causing a second distribution channel encoder to transform the second plurality of feature probability distributions into a second dimension-extended output plurality of distribution codewords for transmission over the transmission channel.

The method may involve receiving the first plurality of distributions representing the source information at an input of a first distribution channel decoder, the first distribution channel decoder being implemented using a polarization stream network, causing the first distribution channel decoder to transform the plurality of distributions into a dimension-reduced output plurality of feature distributions, causing a first source decoder to regenerate the source information from the output plurality of feature probability distributions. The method may also involve receiving an second plurality of distributions representing transformed source information at an input of a second distribution channel decoder, the second distribution channel decoder being implemented using a polarization stream network, causing the second distribution channel decoder to transform the second plurality of distributions into a dimension-reduced output plurality of feature distributions, causing a second source decoder to regenerate the transformed source information from the output plurality of feature probability distributions. The method may also involve performing an iterative cancellation based on the regenerated source information and the transformed source information to generate a refined regeneration of the source information.

In accordance with another disclosed aspect there is provided an encoder apparatus for encoding source information for transmission over a transmission channel. The apparatus includes a source encoder configured to generate a plurality of feature probability distributions representing aspects of the source information, and a distribution channel encoder having an input for receiving the plurality of feature probability distributions, the distribution channel encoder being implemented using a polarization stream network. The distribution channel encoder is configured to transform the plurality of feature probability distributions into a dimension-extended output plurality of distribution codewords for transmission over the transmission channel.

The encoder apparatus may be implemented within a transmitter configured to transmit configuration information to a receiver, the configuration information facilitating configuration of a polarization stream network of the receiver for decoding subsequent transmissions from the transmitter.

The transmitter may be associated with a sensor that generates the source information, the encoder apparatus being operably configured to encode the source information for transmission to the receiver.

Other aspects and features will become apparent to those ordinarily skilled in the art upon review of the following description of specific disclosed embodiments in conjunction with the accompanying figures.

BRIEF DESCRIPTION OF THE DRAWINGS

In drawings which illustrate disclosed embodiments.

DETAILED DESCRIPTION

Figure 1A:
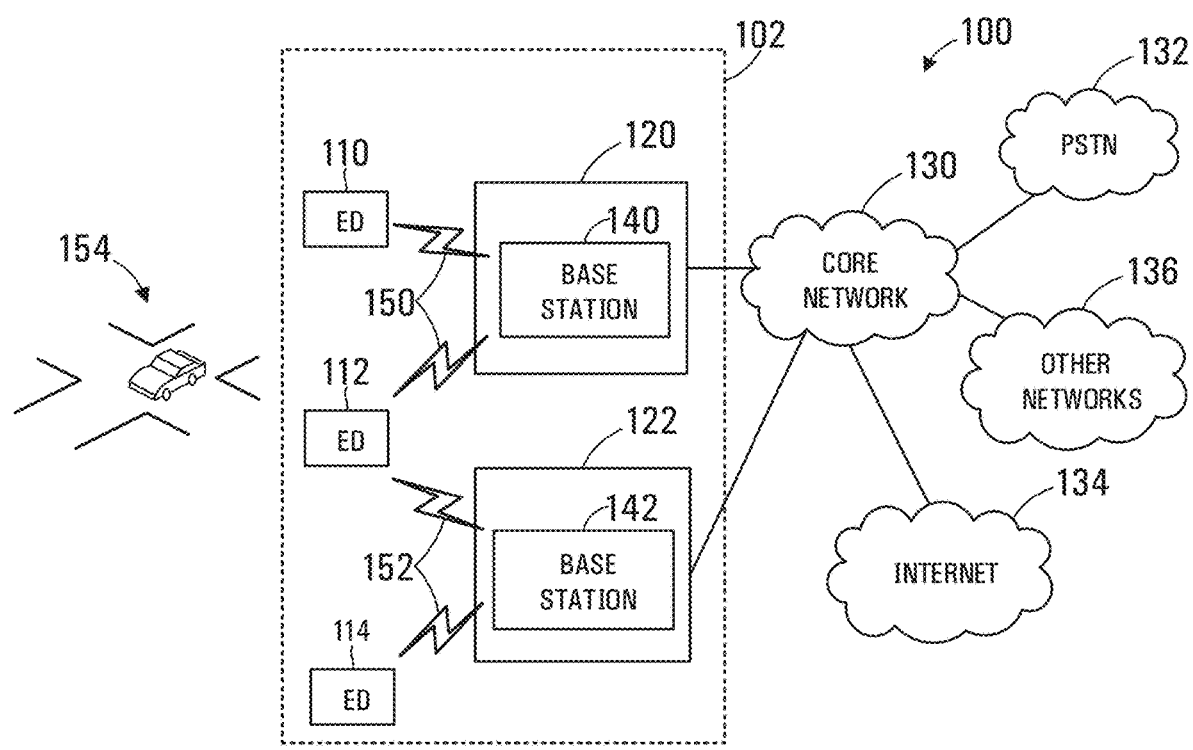
FIG. 1A is a block diagram of an example communication system in accordance with one disclosed embodiment.

FIG. 1A illustrates an example communication system 100 in which embodiments of the present disclosure could be implemented. In general, the system 100 enables multiple wireless or wired elements to communicate data and other content. The purpose of the system 100 may be to provide content (voice, data, video, text) via broadcast, narrowcast, user device to user device, etc. The system 100 may operate efficiently by sharing resources such as bandwidth.

In this example, the communication system 100 includes a wireless communications network 102 including electronic devices (ED) 110-114 and radio access networks (RANs) 120, 122. The system 100 also includes a core network 130, a public switched telephone network (PSTN) 132, the Internet 134, and other networks 136. Although certain numbers of these components or elements are shown in FIG. 1, any reasonable number of these components or elements may be included in the system 100.

The EDs 110-114 are configured to operate, communicate, or both, in the system 100. For example, the EDs 110-114 are configured to transmit, receive, or both via wireless communication channels. Each ED 110-114 represents any suitable end user device for wireless operation and may include such devices (or may be referred to) as a user equipment/device (UE), wireless transmit/receive unit (WTRU), mobile station, mobile subscriber unit, cellular telephone, station (STA), machine type communication device (MTC), personal digital assistant (PDA), smartphone, laptop, computer, touchpad, wireless sensor, or consumer electronics device.

In FIG. 1A, the RANs 120 and 122 include base stations 140 and 142, respectively. Each base station 140, 142 is configured to wirelessly interface with one or more of the EDs 110-114 to enable access to any other base station, the core network 130, the PSTN 132, the Internet 134, and/or the other networks 136.

For example, the base stations 140-142 may include (or be) one or more of several well-known devices, such as a base transceiver station (BTS), a Node-B (NodeB), an evolved NodeB (eNodeB), a Home eNodeB, a gNodeB (sometimes called a "gigabit" NodeB), a transmission point (TP), a transmit/receive point (TRP), a site controller, an access point (AP), or a wireless router. Any ED 110-114 may be alternatively or jointly configured to interface, access, or communicate with any other base station 140-142, the internet 134, the core network 130, the PSTN 132, the other networks 136, or any combination of the preceding. Optionally, the system may include RANs, such as RAN 120, wherein the corresponding base station 140 accesses the core network 130 via the internet 134.

The EDs 110-114 and base stations 140-142 are examples of communication equipment that can be configured to implement some, or all of the functionality and/or embodiments described herein. In the embodiment shown in FIG. 1A, the base station 140 forms part of the RAN 120, which may include other base stations, base station controller(s) (BSC), radio network controller(s) (RNC), relay nodes, elements, and/or devices. Any base station 140 or 142 may be a single element, as shown, or multiple elements, distributed in the corresponding RAN, or otherwise. Also, the base station 140 forms part of the RAN 120, which may include other base stations, elements, and/or devices. Each base station 140-142 may be configured to operate to transmit and/or receive wireless signals within a particular geographic region or area, sometimes referred to as a coverage area. A cell may be further divided into cell sectors, and a base station 140-142 may, for example, employ multiple transceivers to provide service to multiple sectors. In some embodiments a base station 140-142 may be implemented as pico or femto nodes where the radio access technology supports such. In some embodiments, multiple-input multiple-output (MIMO) technology may be employed having multiple transceivers for each coverage area. The number of RAN 120, 122 shown in FIG. 1A is exemplary only. Any number of RAN may be contemplated when devising the system 100.

The base stations 140-142 communicate with one or more of the EDs 110-114 over one or more air interfaces 150 and 152 using wireless communication links e.g. RF, µWave, IR, etc. The air interfaces 150 and 152 may utilize any suitable radio access technology. For example, the system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA) in the air interfaces 150 and 152.

A base station 140-142 may implement Universal Mobile Telecommunication System (UMTS) Terrestrial Radio Access (UTRA) to establish an air interface 150 using wideband CDMA (WCDMA). In doing so, the base station 140-142 may implement protocols such as HSPA, HSPA+ optionally including HSDPA, HSUPA or both. Alternatively, a base station 140-142 may establish an air interface 150 with Evolved UTMS Terrestrial Radio Access (E-UTRA) using LTE, LTE-A, and/or LTE-B. It is contemplated that the system 100 may use multiple channel access functionality, including such schemes as described above. Other radio technologies for implementing air interfaces include IEEE 802.11, 802.15, 802.16, CDMA1800, CDMA1800 1×, CDMA1800 EV-DO, IS-1800, IS-95, IS-856, GSM, EDGE, and GERAN. Of course, other multiple access schemes and wireless protocols may be utilized.

The RANs 120 and 122 are in communication with the core network 130 to provide the EDs 110-114 with various services such as voice, data, and other services. Understandably, the RANs 120 and 122 and/or the core network 130 may be in direct or indirect communication with one or more other RANs (not shown), which may or may not be directly served by core network 130, and may or may not employ the same radio access technology as RAN 120, RAN 122 or both. The core network 130 may also serve as a gateway access between (i) the RANs 120 and 122 or EDs 110-114 or both, and (ii) other networks (such as the PSTN 132, the Internet 134, and the other networks 136). In addition, some, or all of the EDs 110-114 may include functionality for communicating with different wireless networks over different wireless links using different wireless technologies and/or protocols. PSTN 132 may include circuit switched telephone networks for providing plain old telephone service (POTS). Internet 134 may include a network of computers and subnets (intranets) or both, and incorporate protocols, such as IP, TCP, UDP. EDs 110-114 may be multimode devices capable of operation according to multiple radio access technologies, and incorporate multiple transceivers necessary to support such.

The RANs 120, 122, base stations 140, 142, and the core network 130 together may be referred to as "network equipment". The network equipment elements may be physically distributed within a coverage area. The core network 130 generally includes computer processor hardware that interfaces between the PSTN 132, Internet 134, and other networks 136 and the RANs 120, 122 to provide services to the EDs 110-114.

Figure 1B:
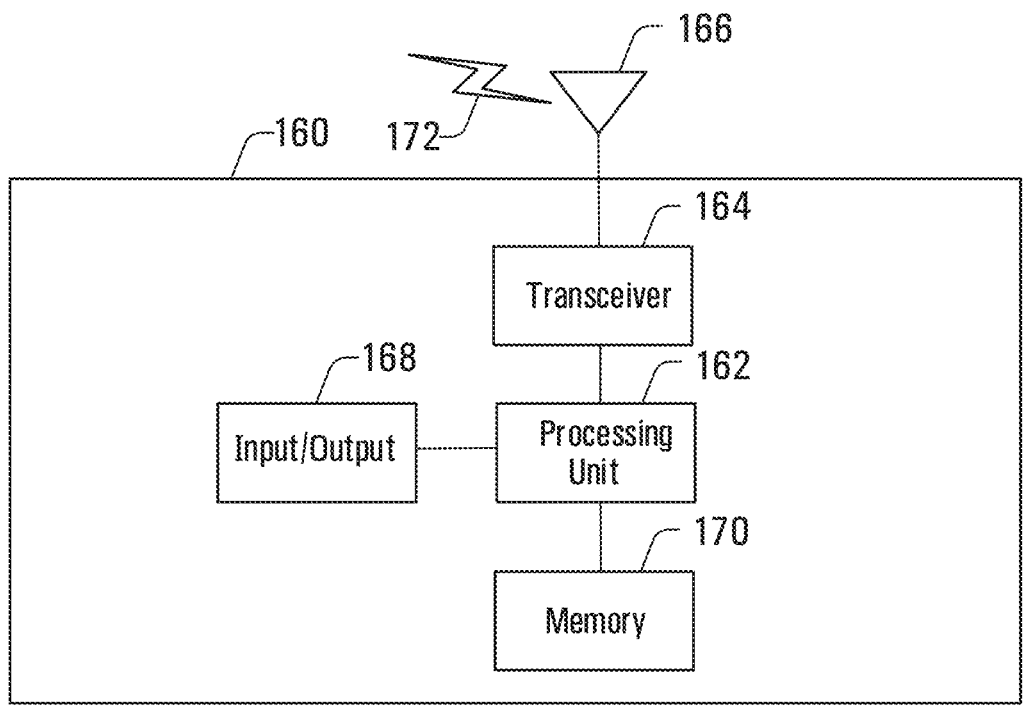
FIG. 1B is a block diagram of an example of an electronic device in accordance with one disclosed embodiment.
Figure 1C:
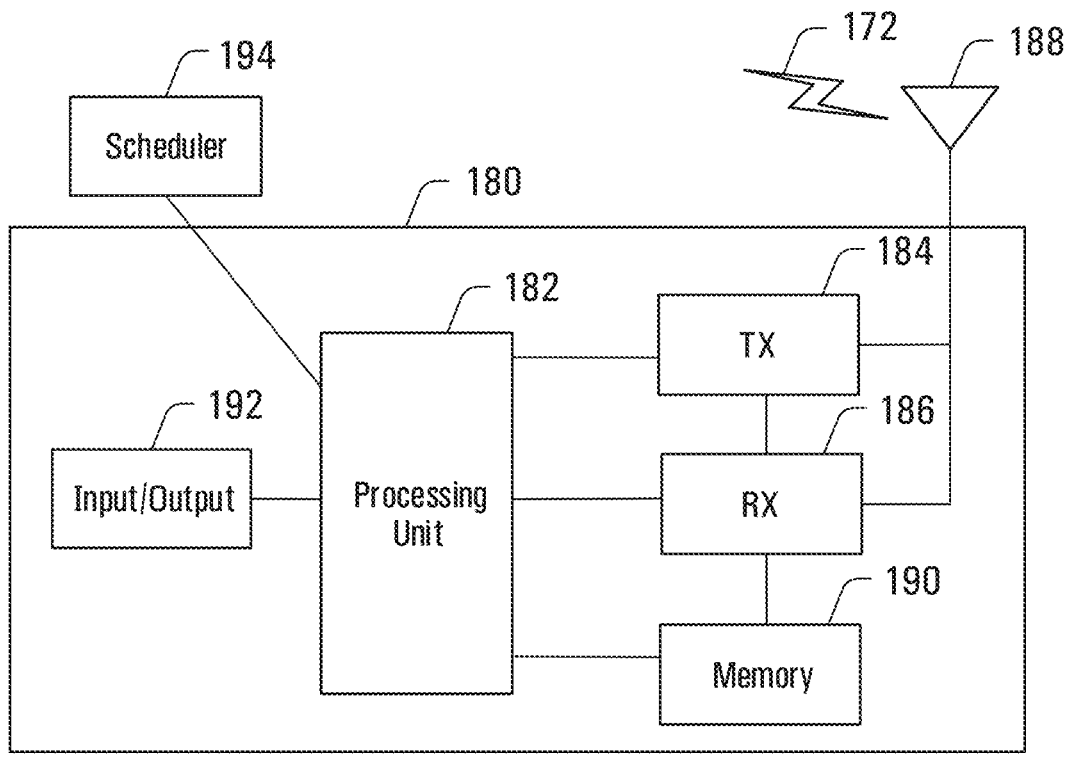
FIG. 1C is a block diagram of an example of a base station in accordance with one disclosed embodiment.

FIGS. 1B and 1C illustrate example devices that may be used in implementing the network 102 shown in FIG. 1A. In particular, FIG. 1B illustrates an example of an ED 160, and FIG. 1C illustrates an example base station 180. These components could be used in the communication system 100 or in any other suitable system.

As shown in FIG. 1B, the ED 160 includes at least one processing unit 162. The processing unit 162 implements various processing operations of the ED 160. For example, the processing unit 162 could perform signal coding, data processing, power control, input/output processing, or any other functionality enabling the ED 160 to operate in the communication system 100. The processing unit 162 may also be configured to implement some or all of the functionality and/or embodiments described in more detail elsewhere herein. Each processing unit 162 includes any suitable processing or computing device configured to perform one or more operations. Each processing unit 162 could, for example, include a microprocessor, microcontroller, digital signal processor, field programmable gate array, or application specific integrated circuit.

The ED 160 also includes at least one transceiver 164. The transceiver 164 is configured to modulate data or other content for transmission by at least one antenna or Network Interface Controller (NIC) 166. The transceiver 164 is also configured to demodulate data or other content received by the at least one antenna 166. Each transceiver 164 includes any suitable structure for generating signals for wireless or wired transmission and/or processing signals received wirelessly or by wire at the antenna 166. Each antenna 166 includes any suitable structure for transmitting and/or receiving wireless or wired signals 172. One or multiple transceivers 164 could be used in the ED 160. One or multiple antennas 166 could be used in the ED 160. Although shown as a single functional unit, a transceiver 164 could also be implemented using at least one transmitter and at least one separate receiver.

The ED 160 further includes one or more input/output devices 168 or interfaces (such as a wired interface to the internet 134 in FIG. 1A). The input/output devices 168 permit interaction with a user or other devices in the network. Each input/output device 168 includes any suitable structure for providing information to or receiving information from a user, such as a speaker, microphone, keypad, keyboard, display, or touch screen, including network interface communications.

In addition, the ED 160 includes at least one memory 170. The memory 170 stores instructions and data used, generated, or collected by the ED 160. For example, the memory 170 could store software instructions or modules configured to implement some or all of the functionality and/or embodiments described herein and that are executed by the processing unit(s) 162. Each memory 170 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 1C, the base station 180 includes at least one processing unit 182, at least one transmitter 184, at least one receiver 186, one or more antennas 188, at least one memory 190, and one or more input/output devices or interfaces 192. A transceiver, not shown, may be used instead of the transmitter 184 and receiver 186. A scheduler 194 may be coupled to the processing unit 182. The scheduler 194 may be included within or operated separately from the base station 180. The processing unit 182 implements various processing operations of the base station 180, such as signal coding, data processing, power control, input/output processing, or any other functionality. The processing unit 182 can also be configured to implement some or all of the functionality and/or embodiments described in more detail herein. Each processing unit 182 includes any suitable processing or computing device configured to perform one or more operations. Each processing unit 182 could, for example, include a microprocessor, microcontroller, digital signal processor, field programmable gate array, or application specific integrated circuit.

Each transmitter 184 includes any suitable structure for generating signals for wireless or wired transmission to one or more EDs or other devices. Each receiver 186 includes any suitable structure for processing signals received wirelessly or by wire from one or more EDs or other devices. Although shown as separate components, at least one transmitter 184 and at least one receiver 186 could be combined into a transceiver. Each antenna 188 includes any suitable structure for transmitting and/or receiving wireless or wired signals 172. Although a common antenna 188 is shown here as being coupled to both the transmitter 184 and the receiver 186, one or more antennas 188 could be coupled to the transmitter(s) 184, and one or more separate antennas 188 could be coupled to the receiver(s) 186. Each memory 190 includes any suitable volatile and/or non-volatile storage and retrieval device(s) such as those described above in connection to the ED 160 in FIG. 1B. The memory 190 stores instructions and data used, generated, or collected by the base station 180. For example, the memory 190 could store software instructions or modules configured to implement some or all of the functionality and/or embodiments described herein and that are executed by the processing unit(s) 182.

Each input/output device 192 permits interaction with a user or other devices in the network. Each input/output device 192 includes any suitable structure for providing information to or receiving/providing information from a user, including network interface communications.

It should be appreciated that one or more steps of the embodiment methods provided herein may be performed by corresponding units or modules, according to FIGS. 1A-1C. For example, a signal may be transmitted by a transmitting unit or a transmitting module. A signal may be received by a receiving unit or a receiving module. A signal may be processed by a processing unit or a processing module. Other steps may be performed by a machine learning (ML) module in both transmitting and receiving modules. The respective units/modules may be implemented using hardware, one or more components or devices that execute software, or a combination thereof. For instance, one or more of the units/modules may be an integrated circuit, such as field programmable gate arrays (FPGAs) or application-specific integrated circuits (ASICs). It will be appreciated that where the modules are implemented using software for execution by a processor unit for example, they may be retrieved by a processor, in whole or part as needed, individually or together for processing, in single or multiple instances, and that the modules themselves may include instructions for further deployment and instantiation. Additional details regarding the EDs such as the ED 160 and the base stations such as 180 are known to those of skill in the art. As such, these details are omitted here.

Generally, the transmission of information from EDs 110-114 will be in accordance with an information transmission scheme, which defines the characteristics of the transmission signal (e.g., channel coding, modulation, and waveform). The EDs 110-114 may have some degree of autonomy to adjust or select a transmission scheme. In other embodiments the EDs 110-114 may rely on the BS 140 and/or other component of the core network 130 to issue commands or messages via wireless downlink channels to adjust or choose the information transmission scheme.

In one embodiment one or more of the EDs 110-114 may be implemented as sensors in a machine-to-machine communications system, which are used to gather information about a subject of interest 154. Examples of sensors may include Internet of Things (IoT) devices, a camera, a smart meter, a wireless sensor, a machine type communication device, or other information-gathering device. For example, the EDs 110-114 may be implemented as camera sensors that capture image information of the subject of interest 154 from different angles. Each of the sensors thus collect image information and transmit the information, over a wireless radio channel, to the base station 140 via the wireless connections 150, 152.

Figure 2:
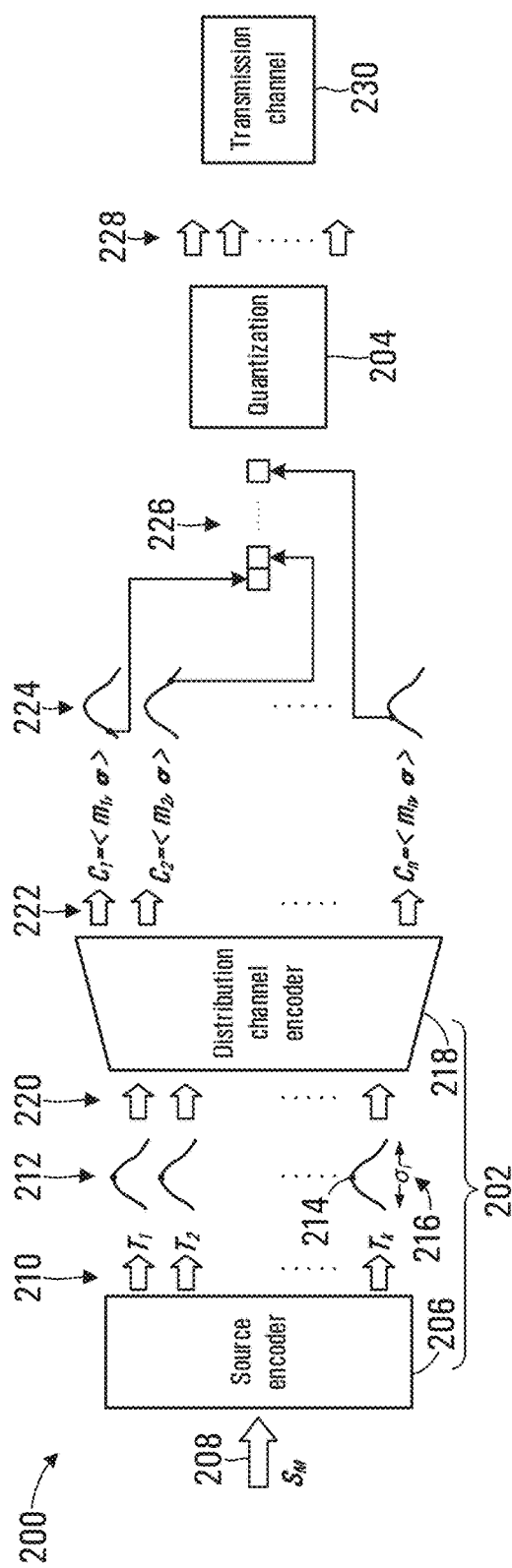
FIG. 2 is a block diagram of a transmitter in accordance with one disclosed embodiment.

Referring to FIG. 2, a block diagram of a transmitter that may be implemented in one of the EDs 110-114 is shown generally at 200. The transmitter 200 includes an encoder 202 and a quantization block 204. The encoder 202 includes a source encoder 206, which has an input 208 for receiving source information $S_M$. The source information may be information captured by a sensor associated with one of the EDs 110-114, as described above. In other embodiments, the source information may be other information related to human-based communications, for example. The source encoder 206 has a plurality of outputs 210 ($T_1$ to $T_k$) for generating a plurality k of feature probability distributions 212. The feature probability distributions 212 represent aspects of the source information. In the embodiment shown, each output 210 generates an output pair $T_i$ (where i is an index of the $i^{th}$ feature among the k features). Each output $T_i$ includes an expectation value 214 and a variance 216, which are associated with the respective feature distributions 212 (i.e. $T_i = \langle m_i, \sigma_i \rangle$). The source encoder 206 thus outputs k pairs of outputs as samples from the feature distributions 212. In this disclosure, values of the variance 216 are expressed as values σ, which is the square root of the variance.

The encoder 202 also includes a distribution channel encoder 218, which includes k inputs 220 for receiving the plurality of k feature probability distributions 212 and n outputs 222 ($C_1$ to $C_n$). The distribution channel encoder 218 transforms (or encodes) the plurality of feature probability distributions 212 into an output plurality of n distributions 224 at the outputs $C_1$ to $C_n$ of the distribution channel encoder. Each distribution may be sampled to produce the outputs, each output being characterized by an output pair including an expectation value m and a variance a, for the single-dimensional distribution shown at 212. In other embodiments the feature probability distributions 212 may be multi-dimensional probability distributions, and the outputs may be characterized by a vector output (or matrix) including a plurality of expectation values m and variances a.

The transformation performed by the distribution channel encoder 218 is a dimension-extended transformation (i.e. n>k). In the embodiment shown the distribution channel encoder 218 receives k Gaussian feature distributions 212 at the inputs 220 and generates n Gaussian output distributions at the outputs 222. In other embodiments the output plurality of distributions 224 may be non-Gaussian probability distributions. The distribution channel encoder 218 is essentially a signal manifold transformer that transforms an input signal manifold (i.e. the plurality of feature distributions 212) into a target manifold (i.e. the output plurality of distributions 224).

The output pairs $\langle m, \sigma \rangle$ associated with the plurality of distributions 224 are sampled and then combined into a block of real values (represented at 226). The quantization block 204 performs a quantization of the block of real values 226, and generates a transmission waveform 228 representing the encoded source information $S_M$. The transmission waveform 228 is transmitted over a transmission channel 230. The transmission channel 230 may be a wireless transmission channel, a wired transmission channel, or other physical transmission channel. The transmission channel 230 is generally subject to noise that may degrade the transmission waveform 228 during propagation over the channel.

In conventional variational autoencoder implementations, the feature distributions 212 would be sampled and expectation values may be directly assembled into blocks of real values and quantized for transmission over the transmission channel 230. In embodiments where the transmitter 200 is used for transmission of IoT source information, the source information content may be unlikely to change significantly over time. The source encoder 206 may thus be configured to extract the k features, and subsequently used for ongoing transmissions without requiring reconfiguration. However, even if the content of the source information remains routine, the k extracted features $\langle m, \sigma \rangle$ will likely vary over time. For example, one output pair for an extracted feature may be $\langle m=3.5, \sigma=0.4 \rangle$ and another may be $\langle m=3.0, \sigma=0.9 \rangle$. These features would be usually quantized based on the worst case by observing a large number of samples to find a range for the output pairs. For example, the range of the expectation values m may be 0.4 to 3.4 and the variance a may be 0.2 to 0.9. In this example, it would be practical to perform the quantization based on an expectation value m=3.4 and a variance σ=0.9. However, this worst case quantization would have the effect of reducing the transmission efficiency. The worst case quantization would also ignore the differing variances associated with different extracted features.

The embodiment of FIG. 2 avoids the above problem by causing the distribution channel encoder 218 to directly encode the feature distributions 212 extracted by the source encoder. The encoder 202 thus extends the k-dimensional distributions 212 into n-dimensional output distributions 224.

Figure 3:
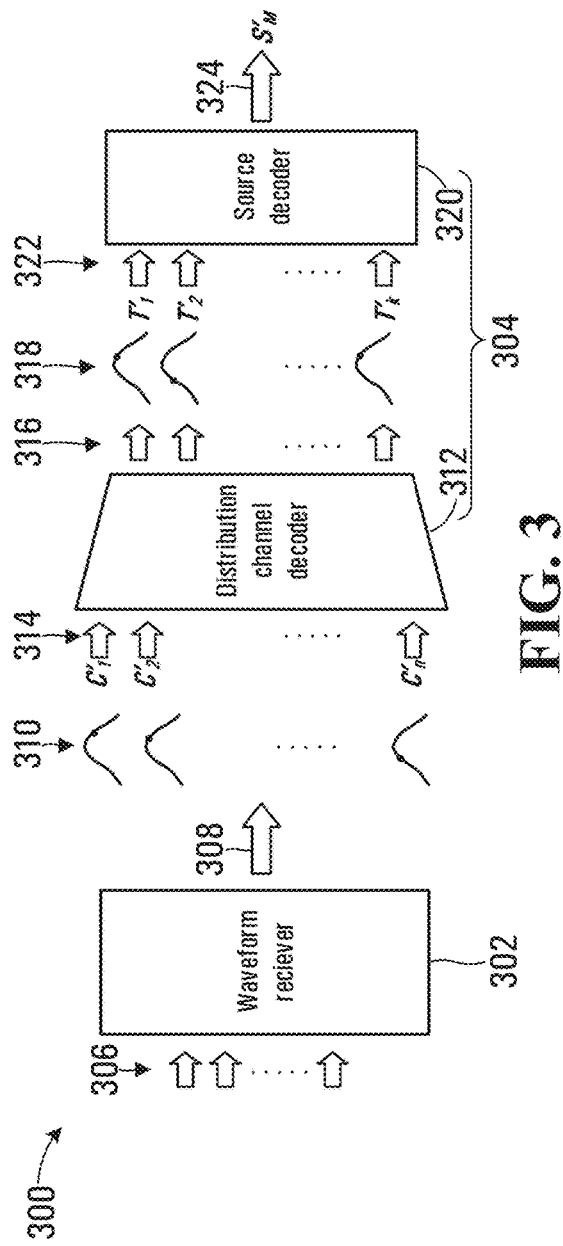
FIG. 3 is a block diagram of a receiver for decoding a transmission of source information from the transmitter of FIG. 1.

Referring to FIG. 3, a block diagram of a receiver is shown generally at 300. The receiver 300 may be implemented in one of the base stations 140 or 142 shown in FIG. 1A, for example. The receiver 300 includes a waveform receiver 302 and a decoder 304. The waveform 228 shown in FIG. 2 is transmitted over the transmission channel 230 and is received as a waveform 306 at the waveform receiver 302. The waveform 306 may have been degraded during transmission over the channel 230, and may thus differ from the transmission waveform 228. The waveform receiver 302 produces a plurality of distributions 310 that represent the source information $S_M$ encoded in the transmission waveform 228. The distributions 310 generally correspond to the output plurality of distributions 224. The plurality of distributions 310 may have expectation values m that differ from the received expectation values of the output plurality of distributions 224 due to noise associated with the transmission channel 230.

The receiver 300 includes a distribution channel decoder 312, having a plurality of inputs 314 for receiving the plurality of distributions 310 and a plurality of outputs 316 for reproducing feature distributions 318. The distribution channel decoder 312 transforms (or decodes) the plurality of distributions 310 into a dimension-reduced output plurality of feature distributions 318 to ($C'_1$ to $C'_n$), that generally correspond to the respective feature distributions 212 ($C_1$ to $C_n$), in FIG. 2.

The decoder 304 further includes a source decoder 320, including inputs 322 for receiving the plurality of feature distributions 318 and an output 324, for producing a regeneration of the source information $S_M$. The source decoder 320 produces regenerated source information $S'_L$ at the output 324 in response to receiving the plurality of feature distributions 318 at the inputs 322. In cases where the received expectation values remain within the original variances $\sigma_1$ to $\sigma_k$ associated with the respective feature distributions 212, the regenerated source information $S'_M$ should generally correspond to the source information $S_M$. A sample value m falling within the distribution described by the pair $<m_i,\sigma_i>$ should thus be sufficient for the decoder to recover the source information. The feature distributions 212 and 318 are often referred to as being in "latent space" because these represent intermediate outputs that are associated with extracting features of the source information. Similarly, the distributions 224 and 318 represent latent signal manifolds.

The transmitter 200 thus implements a dimension-extended transformer as a distribution channel encoder by extending the k-dimensional Gaussian feature manifold into a n-dimensional Gaussian manifold, through the addition of (n−k) redundant dimensions. The coding rate for the encoding scheme would be k/n, where n>k. The integration of the source encoder 206 and distribution channel encoder 218 breaks the assumption of independent and identically distributed (i.i.d.) variables for the encoder 202. The removal of the i.i.d. assumption enables improved encoder/decoder configurations, as described later herein.

The source encoder 206 is implemented as a probabilistic encoder that encodes the source information $S_M$ into the respective feature distributions 212. Similarly, the source decoder 320 is implemented as a probabilistic decoder, which aims to recover the source information $S_M$ (as $S'_M$) from the plurality of feature distributions 318. The source encoder 206 and source decoder 320 may be implemented using an encoder neural network such as a deep neural network (DNN). The neural network of the source encoder 206 may be trained to extract the k most essential features from the source information $S_M$, where the extracted features are generally independent of each other. The source decoder 320 may be similarly trained to recover the source information from the k essential features. In one embodiment the source encoder 206 and source decoder 320 may be jointly optimized to maximize the likelihood (for example by minimizing the L2 distance) between $S_M$ and $S'_M$. The joint optimization may be performed using a machine-learning based approach.

The source encoder 206 and source decoder 320 may each implement a variational autoencoder (VAE) algorithm. VAEs are neural network configurations that are configured to operate on source information having an underlying probability distribution (such as Gaussian distribution). Suitable configurations for VAE source encoder and source decoder are described in commonly owned U.S. patent application Ser. No. 16/428,396, filed on May 31, 2019, and entitled "METHODS AND APPARATUSES FOR FEATURE-DRIVEN MACHINE-TO-MACHINE COMMUNICATIONS", which is incorporated herein by reference in its entirety.

Figure 4:
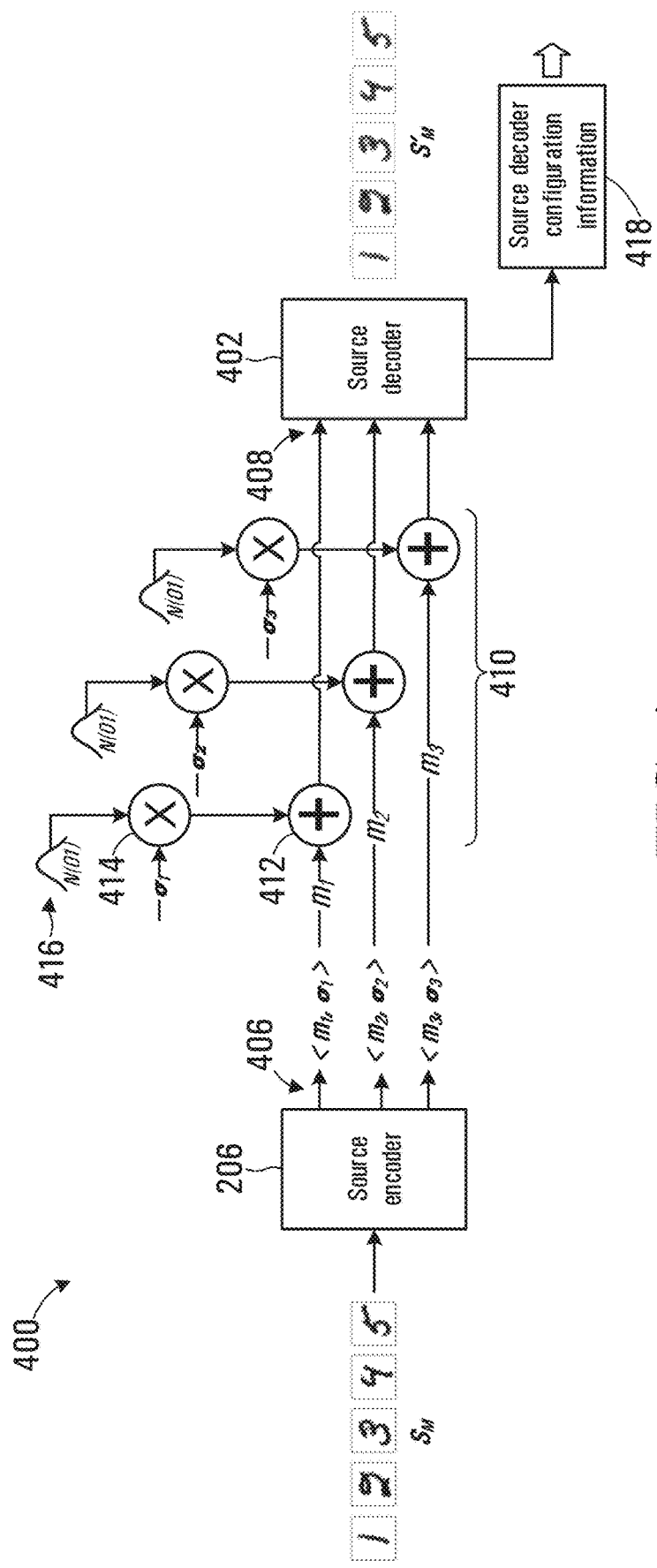
FIG. 4 is a block diagram of a training configuration for training a source encoder of the transmitter shown in FIG. 1 and a source decoder of the receiver shown in FIG. 2.

Referring to FIG. 4, a block diagram of a training configuration is shown generally at 400. In the training configuration 400, the source encoder 206 and a source decoder 402 may each implement VAE algorithms for encoding and decoding the source information. The source decoder 402 is configured to correspond to the source decoder 320 of the receiver 300. However, for purposes of training the network, in the embodiment the source decoder 402 is implemented at the transmitter 200.

The source encoder 206 is configured to receive source information $S_M$ and has outputs 406 for producing output pairs $<m_i, \sigma_i>$ where i=1 . . . 3 in this training example. The source encoder 206 thus extracts three features to represent the source information training set. In other embodiments, a larger number of features may be extracted. The source decoder 402 has k inputs 408 corresponding to the k outputs 406 of the source encoder 206. The outputs 406 of the source encoder 206 are each connected via summation blocks 410 directly to the inputs 408 of the source decoder 402, thus omitting the transmission channel 230 for purposes of training. The source decoder 402 is configured to output a reproduced version of the source information $S_M$ as $S'_M$.

The source encoder 206 is configured to extract important features from the source information $S_M$. As a result, the reproduced source information $S'_M$ may be somewhat degraded. In this training embodiment, the source information $S_M$ is a training set based on the Modified National Institute of Standards and Technology database (MNIST database) of handwritten digits that are commonly used for training image processing systems. Each character provides a 28×28 pixel training input and in this embodiment the source encoder 206 may thus include 784 inputs for receiving the pixels as training inputs. Various other training sets may be used, depending on the type of source information to be encoded.

The training of the encoder 206 and decoder 402 may be performed to satisfy a first target of maximizing likelihood (ML) between the output $S'_M$ of the source decoder 402, and the source information training set $S_M$. Training based on maximizing likelihood ensures reliability of reproduction of the source information. The ML process involves determining a set of parameters for the source encoder 206 and source decoder 402 that result in the reproduced output $S'_M$ corresponding to the source information training set $S_M$. In one embodiment the ML process may involve minimizing a L2 distance between the output $S'_M$ of the source decoder 402, and the source information training set $S_M$.

The training of the encoder 206 and decoder 402 may also be performed to satisfy a second target, in which a relative entropy between the output of the feature encoder neural network and a target distribution is minimized. In one embodiment, this may involve minimizing the Kullback-Leibler divergence (KL divergence) between the k latent features and a target Gaussian distribution. Minimization of the KL divergence between k features in the k-dimensional Gaussian manifold forces each feature, as closely as possible, to resemble the target Gaussian distribution. In this embodiment, the training configuration 400 includes a multiplier block for of the summation blocks 410. For example, the $<m_1, \sigma_1>$ output is connected to a summation block 412, which in turn is connected to a multiplication block 414. The remaining summation and multiplication blocks are similarly connected for each of the outputs 406. In this embodiment the target of minimizing the KL divergence is implemented for each output 406 by multiplying the variance a and a standard normal distribution 416 (N (0,1)). In this embodiment, the standard normal distribution provides a shape for the target distribution and has a zero expectation value m and a unit variance σ=1. For the example of the output $<m_1, \sigma_1>$, the standard normal distribution 416 is first multiplied by $\sigma_1$ to scale the variance of the standard normal distribution to $\sigma_1$. The resulting scaled normal distribution is then shifted by adding $m_1$ at the summation block 412. The addition of $m_1$ causes the mean of the standard normal distribution to be shifted from zero to $m_1$. The same operation is performed for the $<m_2, \sigma_2>$ and the $<m_3, \sigma_3>$ outputs of the source decoder 402.

In this embodiment the training of the source encoder 206 and source decoder 402 is performed by the transmitter 200. The resulting neural network weights and biases determined for the source decoder are output as configuration information 418. The source decoder configuration information 418 may be transmitted to the receiver 300 over the transmission channel 230 or via another control channel. The receiver 300 is then be able to configure the source decoder 320 for decoding received feature distributions 318. In the example of the transmitter being an IoT sensor, one of the EDs 110-114 may thus perform the training. The ED may then provide the base station 140 with the necessary configuration information, to configure a source decoder for decoding the transmitted source information. In this embodiment, the configuration information may be securely transmitted to the base station 140, which has the effect of making the transmission of the source information private. The source information may thus only be decoded by a receiver that has received the configuration information.

In a conventional implementation of the source encoder 206, the feature distributions 212 would be quantized into bits and combined into blocks of bits for transmission to the receiver 300. In the encoder embodiment shown in FIG. 2, rather than quantizing the feature distributions for transmission over the transmission channel 230, the feature distributions are directly encoded by the distribution channel encoder 218. The distribution channel encoder 218 is thus provided with a k-dimensional feature distribution input, and outputs n-dimensional output distributions. As disclosed above the, distribution channel encoder 218 performs a dimension-extended transformation (i.e. k>n) between the input signal manifold (i.e. the plurality of feature distributions 212) to a target manifold (i.e. the output plurality of distributions 224).

The distribution channel encoder 218 may be implemented using a polarization stream network. Details of configurations and training of forward and reverse polarization stream networks are described in commonly owned U.S. patent application Ser. No. 16/562,045 filed on Sep. 5, 2019 and entitled "A METHOD AND APPARATUS FOR WIRELESS COMMUNICATION USING POLARIZATION-BASED SIGNAL SPACE MAPPING", which is incorporated herein by reference in its entirety. The polarization stream network provides a framework for transforming between any two multiple-dimensional signal manifolds having the same dimensions. The polarization stream network doesn't require a full mathematical description of the source or target signal manifolds.

Figure 5:
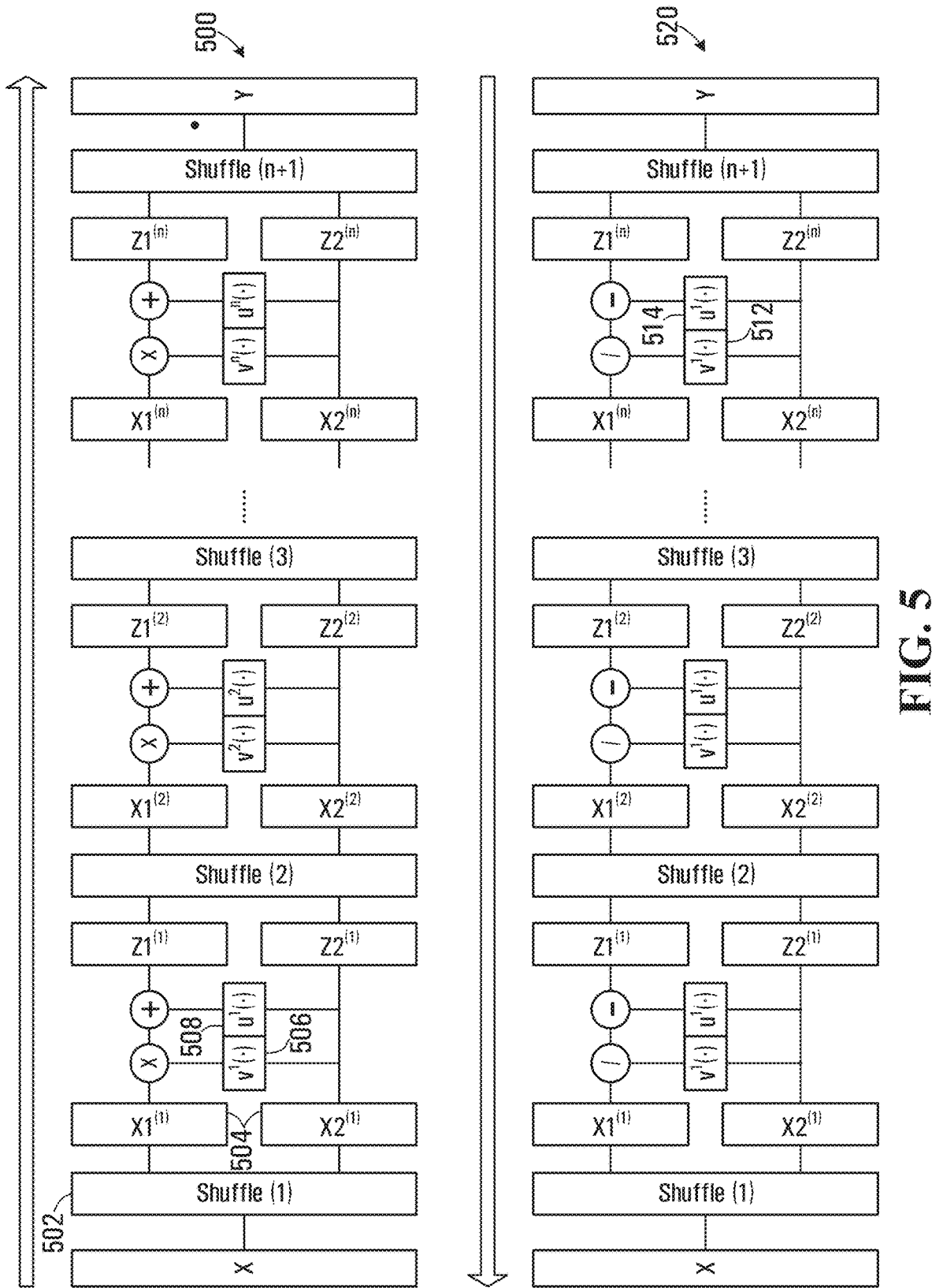
FIG. 5 is a block diagram of a forward polarization stream network used in a distribution channel encoder of the transmitter shown in FIG. 1 and a block diagram of a reverse polarization stream network used in a distribution channel decoder of the receiver shown in FIG. 2.

Referring to FIG. 5, configurations of a forward polarization stream network 500 and a reverse polarization stream network 520 are shown schematically in generalized form. The forward and reverse polarization stream networks 500 and 520 each include a cascade of n stages that transform between an input signal X and an output signal Y having the same number of dimensions. The input signal X may include a plurality of bits of information representing a complex value signal. Each stage in the cascade of stages is similarly configured and includes a shuffle block 502, a split block 504, a scaling function 506, and an offset function 508. The shuffle block 502 implements a shuffle or permutation function that receives the set of input bits X and outputs a set of shuffled or permuted bits. The shuffle or permutation may be performed in accordance with a permutation table, for example. The split block 504 implements a split function, which splits the shuffled bits into a first shuffled bit group $X1^{(1)}$ and a second shuffled bit group $X2^{(1)}$. With the inclusion of the scaling function 506 and offset function 508, each stage in the cascade may be written as follows:

$$\vec{Z1}^{(n)} = \vec{X1}^{(n)} \times v(\vec{X2}^{(n)}) + u(\vec{X2}^{(n)})$$

$$\vec{Z2}^{(n)} = \vec{Z2}^{(n)}$$

$$\vec{X}^{(n)} = \text{shuffle}_n(\vec{Z}^{(n-1)}), \quad \text{Eqn1}$$

where the x operator is a dot-wise (or more generally element-wise) multiplication and the + operator represents element-wise addition operation between two operand vectors. Thus, each stage shuffles the input signals, and splits the shuffled information into a first group, $\vec{X1}$ and a second group, $\vec{X2}$. The scaling function v(•) 506 is applied to the second group $\vec{X2}$ to generate a scaling vector (v($\vec{X2}$)), and the offset function u(•) 508 is applied to the second group $\vec{X2}$ to generate an offset vector (u($\vec{X2}$)). Both the scaling vector and the offset vector have dimension size equal to the first group $\vec{X1}$. The output of each stage $\vec{Z1}''$ is obtained by element-wise multiplying the first information group with the scaling vector, then element-wise adding the offset vector. The output $\vec{Z2}''$ is a copy of the second information group $\vec{X2}$.

The reverse polarization stream network 520 operates on an input signal Y and produces an output signal X. The x operator is replaced by a dot-wise (or more generally element-wise) division and the + operator is replaced by an element-wise subtraction operation between two operand vectors. The scaling function v(•) 512 and offset function u(•) 514 are unchanged from the forward polarization stream network 500. Thus, each stage in the reverse polarization stream network 520 shuffles the input signal and splits the shuffled information into a first group $\vec{Z1}$ and a second group $\vec{Z2}$. The scaling function v(•) 512 is applied to the second group $\vec{Z2}$ to generate a scaling vector (v($\vec{Z2}$)), and the offset function u(•) 514 is applied to the second group $\vec{Z2}$ to generate an offset vector (u($\vec{Z2}$)). Both the scaling vector and the offset vector have dimension size equal to the first information group. The outputs for each stage are thus given by:

$$\vec{X1}^{(n)} = (\vec{Z1}^{(n)} - u(\vec{Z2}^{(n)}))/v(\vec{Z2}^{(n)})$$

$$\vec{X2}^{(n)} = \vec{Z2}^{(n)}$$

$$\vec{Z}^{(n)} = \text{shuffle}_n(\vec{X}^{(n+1)}) \quad \text{Eqn2}$$

The second output $\vec{X2}$ is a copy of the group $\vec{Z2}$. The first output information group is obtained by element-wise subtracting the offset vector from the first information group, then element-wise dividing by the scaling vector.

Due to common elements appearing in both the forward and reverse polarization stream networks 500 and 520, it is only necessary to perform the training for either the forward or the reverse network. For example, if the forward network 500 were to be trained, the reverse network 520 may be easily obtained by exchanging the multiplication and division operators, and the addition and subtraction operators, and reversing the input and output. The addition of the scaling function to the polarization stream networks 500 and 520 depresses the reliability of some points or dimensions and boosts the reliability of other points or dimensions. Together, the scaling function v(•) and the offset function u(•) provide flexibility to polarize the reliabilities over the signal space for shaping of the input X to the output Y.

Figure 6:
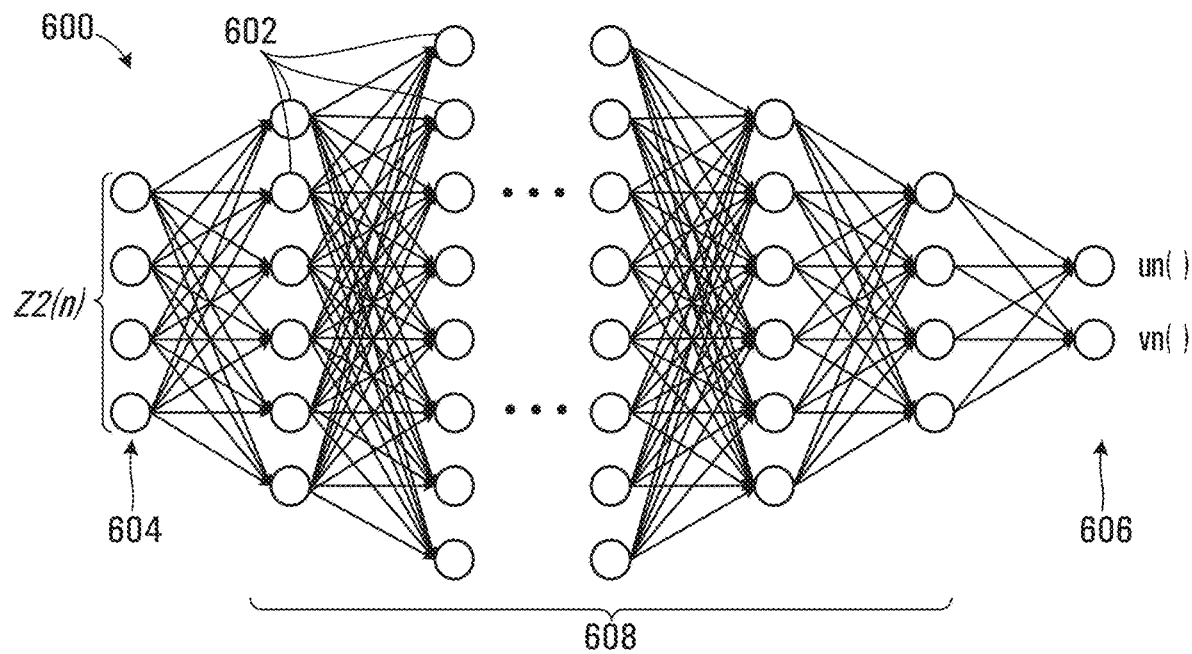
FIG. 6 is a schematic representation of a neural network for implementing a scaling function and an offset function used in the polarization stream networks shown in FIG. 5.

In one embodiment, the scaling and offset functions v(•) and u(•) may be implemented as neural networks within the forward and reverse polarization stream networks 500 and 520. An example of a neural network portion for implementing the scaling and offset functions v(•) and u(•) is shown in FIG. 6 at 600. The neural network 600 includes sets of fully connected nodes 602 in multiple layers including an input layer 604, an output layer 606, and multiple hidden layers 608. The input layer 604 includes nodes that receive the second group vector $\overrightarrow{Z2^n}$. The output layer 606 includes output nodes that provide the scaling and offset functions v(•) and u(•) for each stage in the cascade of stages for the forward and reverse polarization stream networks 500 and 520. Each arrow connecting between the nodes may have an associated weighting factor $w_i$, which is determined in a training exercise.

Figure 7:
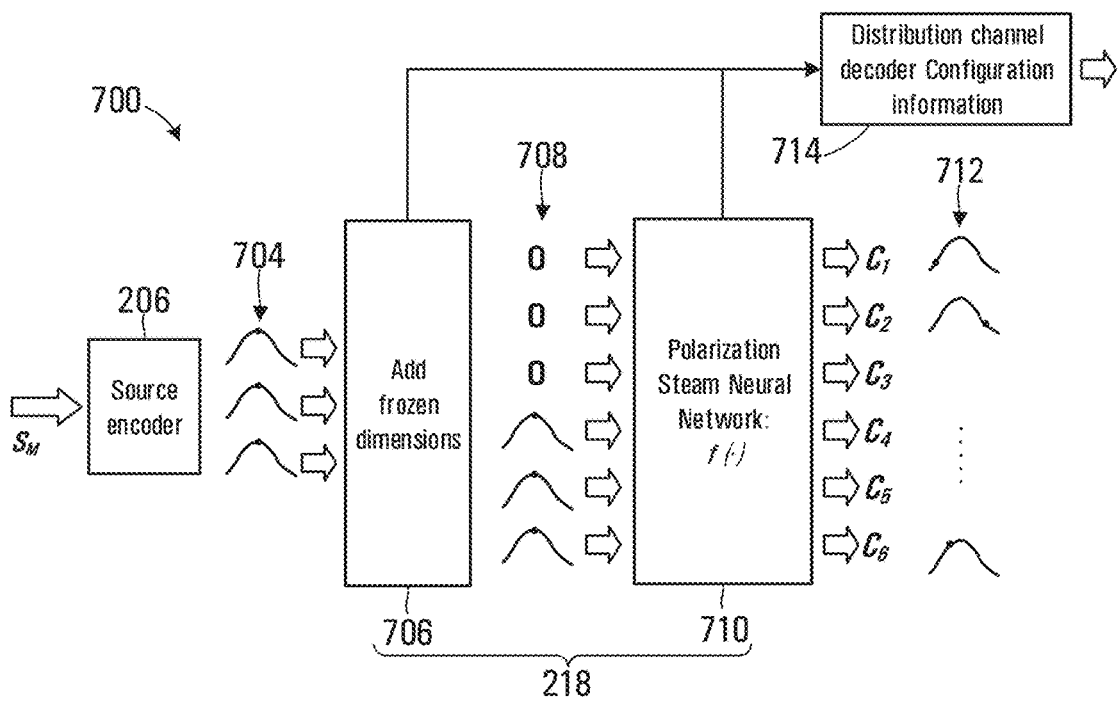
FIG. 7 is a block diagram of a training configuration for training the polarization stream network of the distribution channel encoder.

Referring to FIG. 7, a block diagram of a training configuration for training the polarization stream network of the distribution channel encoder 218 is shown generally at 700. In this example, a trained source encoder 206 receives a source information training set $S_M$. The source encoder 206 extracts 3 feature distributions 704 for representing the source information $S_M$ (i.e. k=3). The distribution channel encoder 218 includes a forward polarization stream network ƒ(•) shown as block 710 in FIG. 7. The forward polarization stream network 710 may be configured generally as shown in FIG. 5 at 500. In this example, the forward polarization stream network 710 is configured for 6 input dimensions. To remain invertible, the forward polarization stream network 710 also has 6 output dimensions. The distribution channel encoder 218 further includes a block 706, which adds frozen dimensions to the feature distributions 704 to make up the 6 input dimensions, as shown at 708. In this example, block 706 adds three input dimensions that are collapsed to a zero value (or some other constant value). The collapsed dimensions, along with the extracted feature distributions 704, make up the inputs 708 for the forward polarization stream network 710.

For the training of the forward polarization stream network 710, a target 6-dimensional signal manifold 712 is established. In some embodiments the target manifold 712 may be thickened to train the distribution channel encoder 218 to tolerate some noise. The training process results in weights and biases being determined for the neural network portions of the forward polarization stream network 710. In this embodiment, only the forward polarization stream network 710 of the distribution channel encoder 218 is trained.

Following training, block 710 outputs distribution channel decoder configuration information 714. The configuration information 714 includes weights and biases for the scaling and offset functions v(•) and u(•) (shown in FIG. 5), the number and configuration of the polarization stages, and details of the implemented shuffle functions. The configuration information 714 may include the configuration for the forward polarization stream network 710, and leave the receiver 300 to reverse the forward polarization stream network. Alternatively, the configuration information 714 may include the derived configuration for a reverse polarization stream network. Block 706 also outputs an identification of the frozen dimensions to block 714. The configuration information may be transmitted to the source decoder 320 via the transmission channel 230, or via another existing communications channel between the transmitter 200 and the receiver 300.

Figure 8:
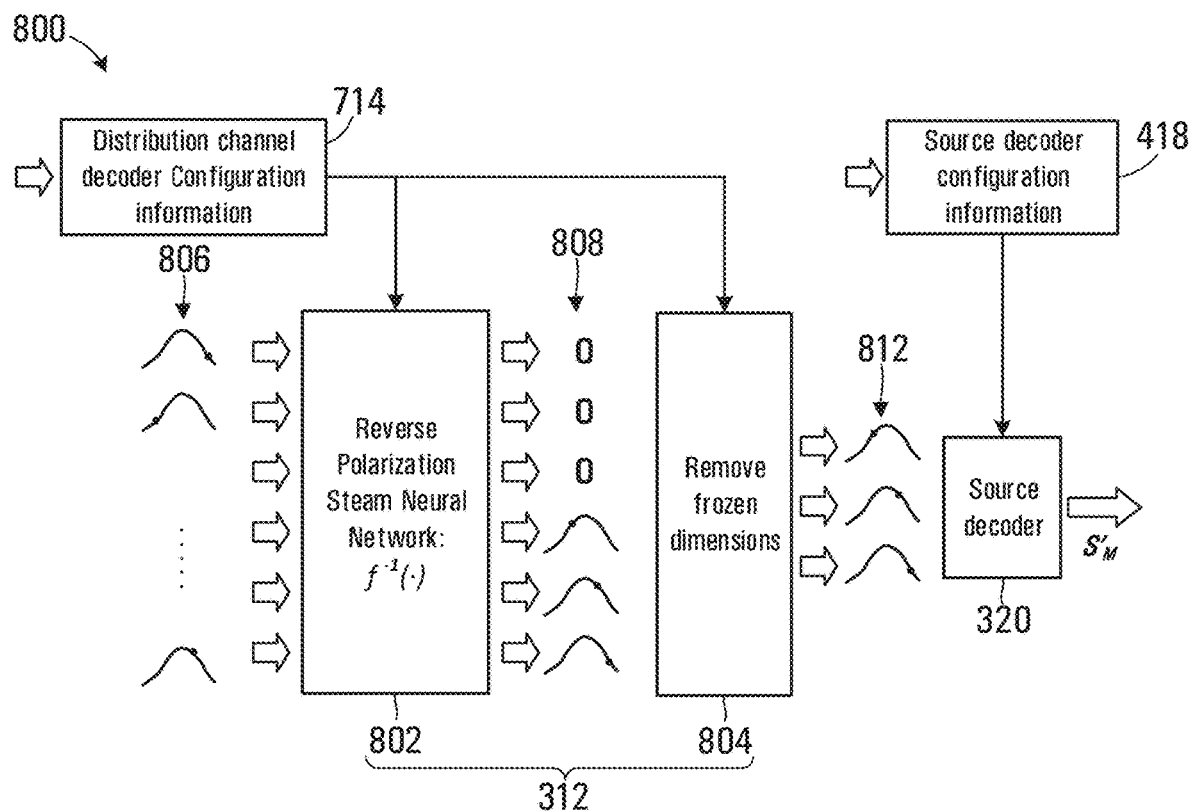
FIG. 8 is a block diagram illustrating aspects of the configuration of the distribution channel decoder and source decoder of the receiver shown in FIG. 3.

Referring to FIG. 8, a block diagram illustrating aspects of the configuration of the distribution channel decoder 312 and source decoder 320 (shown in FIG. 3) is shown generally at 800. The distribution channel decoder 312 includes a reverse polarization stream neural network PH, shown as block 802. The reverse polarization stream network 802 may be configured generally as shown in FIG. 5 at 520, and in this example includes 6 input dimensions 6 output dimensions. The distribution channel encoder configuration information 714 received from the transmitter 200 is used to configure the reverse polarization stream network 802. Because the weights and biases of the forward polarization stream network 710 have already been trained, no further training is necessary at the receiver. The distribution channel decoder 312 also includes a block 804 for removing frozen dimensions, which are identified in the configuration information 714. As an example, an input of a plurality of distributions 806 is transformed by the reverse polarization stream network 802 into the plurality of outputs 808. The outputs include the three frozen dimensions indicated by the "0" values and three feature distributions. The block 804 uses the configuration information 714 to identify and discard the frozen distributions, and outputs the 3 remaining distributions as shown at 812.

The source decoder, which is also implemented using a neural network, is configured using the source decoder configuration information 418, which was determined by the transmitter during the training exercise described above in connection with FIG. 4. After configuration, the distribution channel decoder 312 and source decoder 320 are ready for operation in the receiver 300 as shown in FIG. 3. The source decoder 320 receives the 3 remaining dimensions 812 and decodes the distributions to recover the source information as $S'_M$.

In the embodiment described above, the frozen dimensions are discarded. However, in an alternative embodiment, the n-dimensional vector including the frozen dimensions may be decoded using a successive cancellation algorithm. Rather than discard the (n–k) frozen dimensions, these dimensions may thus be used to assist in the decoding of the k useful dimensions.

Figure 9:
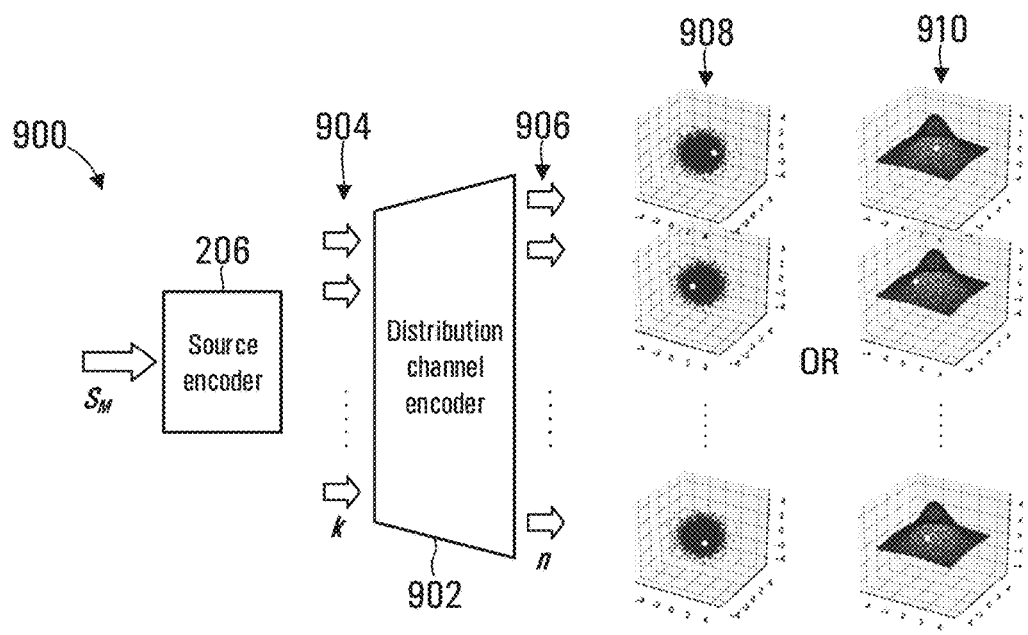
FIG. 9 is a simplified block diagram of an alternative encoder embodiment.

Referring back to FIG. 2, the output 222 of the distribution channel encoder 218 is an n-dimensional Gaussian target manifold, including the output plurality of distributions 224. The transmission waveform 228 over the transmission channel 230 is limited in accordance with the Shannon-Hartley channel capacity theorem. Encoding steps prior to the combining of samples into the block of information bits at 226, are not subject to Shannon-Hartley capacity limits, which assumes that each information bit is independent and identically distributed (i.i.d). The encoder 202 is configured to accept the inherent unequal importance among the k feature probability distributions 212 by directly encoding the feature probability distributions into the output plurality of distributions 224, rather than quantizing the feature probability distributions prior to encoding. Referring to FIG. 9, a simplified block diagram of an alternative encoder that extends the non-Shannon processing of the source information $S_M$ is shown generally at 900. The encoder 900 includes the source encoder 206 for extracting k features from the source information $S_M$. A distribution channel encoder 902 is configured to implement a forward polarization stream network, configured generally as shown in FIG. 5 at 500. The distribution channel encoder 902 is configured to transform k extracted features 904 into an n-dimensional output 906. However, in this embodiment, the forward polarization stream network of the distribution channel encoder 902 is trained to generate a non-Gaussian target manifold. An example of an orthonormal non-Gaussian target manifold is shown at 908. An example of a non-orthonormal non-Gaussian target manifold is shown at 910.

The target manifolds 908 or 910 may configured to adapt to a transmission channel 230 having non-Gaussian channel conditions. For example, attenuations for transmissions over the transmission channel 230 may not be uniformly distributed. The target manifold 908 or 910 may be configured to avoid regions within the channel that have larger attenuations, and rather transmit the information over less attenuated regions of the transmission channel.

Figure 10:
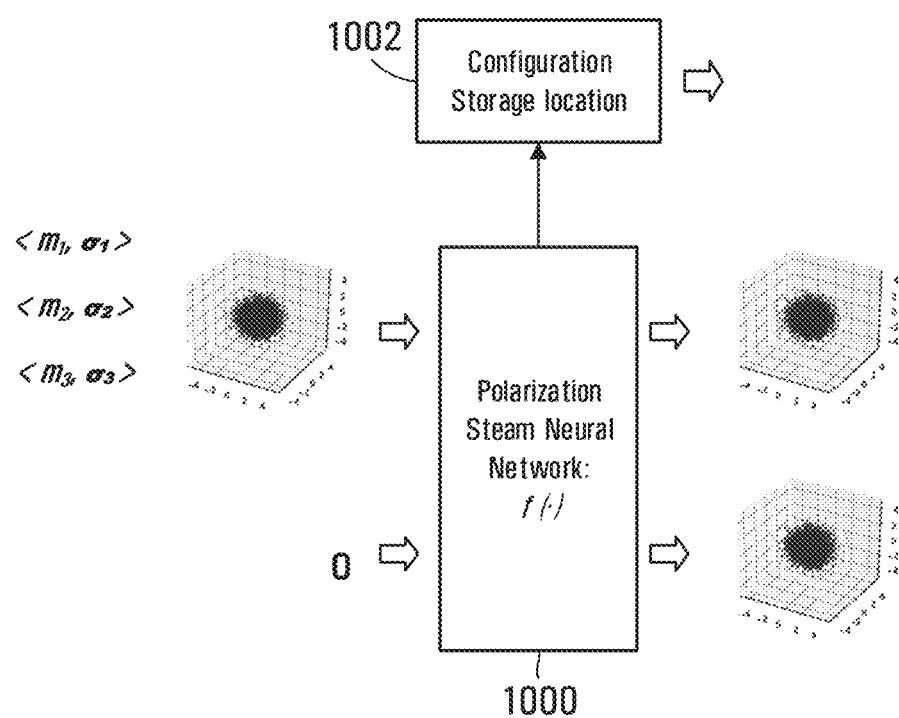
FIG. 10 is a block diagram of an alternative configuration for training a polarization stream network.

In the training example shown in FIG. 7, the transmitter 200 trains its own forward polarization stream network 710 of the distribution channel encoder 218 and transmits the configuration information 714 to the receiver 300. Referring to FIG. 10, in an alternative embodiment, a polarization stream network 1000 may be trained to generate a plurality of distribution channel encoder configurations having different k and n. These configurations may be trained by the receiver 300, or other network equipment. Configuration information for the trained configurations, including the identification of frozen dimensions and the k and n values, may be saved into a storage location 1002. The receiver 300 may thus select a training configuration from the storage location based on k and n, and transmit configuration information for the selected configuration to the transmitter 200, for configuring the distribution channel encoder 218.

The embodiment of FIG. 10 may be advantageous in a situation where there is a plurality of IoT transmitters that extract similar features, and where the receiver 300 is implemented on a base station (such as the base station 140 shown in FIG. 1A). As an example, in FIG. 1A, if two or more IoT sensors capture information about the subject of interest 154 from different perspective viewpoints, the associated transmitters may cooperate to deliver optimal communications performance. The trained configurations may thus be reused for more than one IoT transmitter. As an example, in the case of a trained configuration for k=3 extrcted features, one of the three extracted features will be more important than the other two extracted features. However, for each specific IoT transmitter, the most important extracted feature may differ between members of the plurality of IoT transmitters. For this reason, from the perspective of the receiver, each of the 3 features may need to be treated as equally important when generating the plurality of distribution channel encoder configurations for k=3. In this embodiment, the training may be performed on the basis of a globe Gaussian manifold rather than an ellipsoid Gaussian manifold. This would make the training more generally applicable for all of the plurality of IoT transmitters.

As disclosed above, integration of the source encoder and distribution channel encoder breaks the i.i.d. assumption and enables an encoder/decoder configuration that resembles a conventional turbo-code scheme. Conventional turbo code channel coding algorithms implement an iterative or successive cancellation decoding scheme between two convolutional decoders to reach an optimized coding performance. A turbo encoder uses two convolutional encoders, where one encodes the original source bits and the other encodes interleaved source bits.

Figure 11:
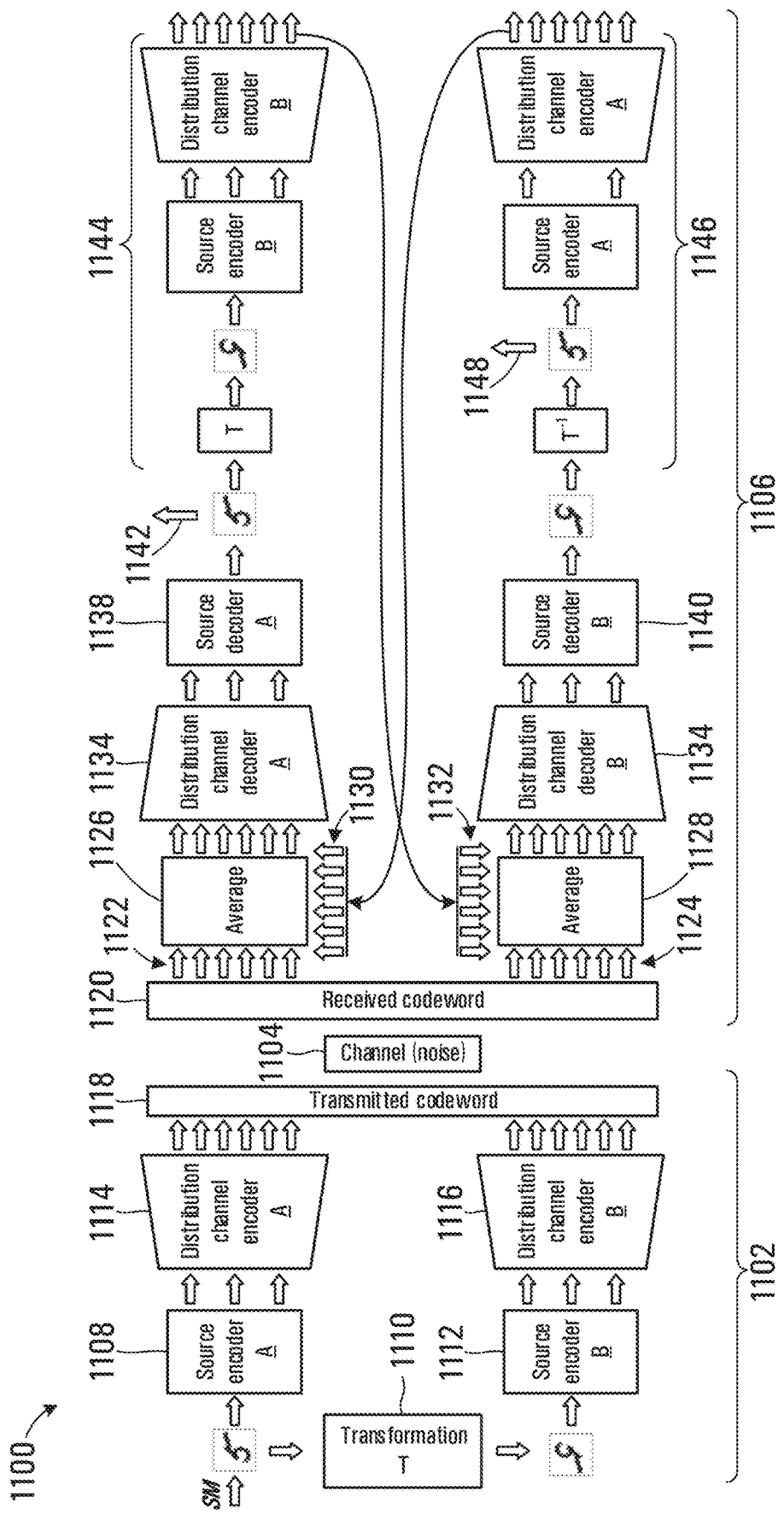
FIG. 11 is a block diagram of another disclosed embodiment implementing a feedback loop for decoding an encoded transmission from an encoder.

Referring to FIG. 11, a configuration that extends the turbo code concept into the current context, is shown as a simplified block diagram at 1100. The configuration 1120 includes a transmitter 1102, a transmission channel 1104, and a receiver 1106. A source information input $S_M$ is received at a source encoder 1108 of the transmitter 1102. The same source information input $S_M$ is transformed by a pseudo-random transformation block 1110, where the pseudo-random transformation is represented by "T". As a simplified example, in this embodiment the transformation T causes the source information input $S_M$ to be rotated by 180°, which then provides an input for a source encoder 1112. In practice, the transformation T would perform a more random transformation of the source information than a simple rotation. The transformation block 1110 is thus analogous to the bit-interleaver implemented in a conventional turbo code encoder/decoder, which destroys the relevance between the original information and transformed or interleaved one. In an IoT camera embodiment, the transformed source information may be alternatively provided by a second camera having a different view angle.

The source encoder 1108 extracts features from the source information input $S_M$, which provide an input to a distribution channel encoder 1114. The distribution channel encoder 1114 implements a forward polarization stream network. The source encoder 1108 and the distribution channel encoder 1114, each labeled as "A" in FIG. 11, are trained generally as described above. The source encoder 1112 extracts features from the transformed source information input $S_M T$, which provide an input to a distribution channel encoder 1116. The distribution channel encoder 1116 implements a forward polarization stream network. The source encoder 1112 and the distribution channel encoder 1116, each labeled as "B" in FIG. 11, are also trained as described above. The outputs of the distribution channel encoder 1114 and the distribution channel encoder 1116 are combined into a transmitted codeword by block 1118.

After propagating over the transmission channel 1104, the noised combined codewords are received at block 1120. The received combined codewords are then separated into codeword inputs 1122 and 1124, corresponding to the respective outputs of the distribution channel encoder 1114 and distribution channel encoder 1116. The separated codeword inputs 1122 and 1124 are received at respective average blocks 1126 and 1128. The average blocks 1126 and 1128 each include a respective second feedback input 1130 and 1132. The average block 1126 outputs an average taken between the separated codeword input 1122 and the feedback input 1130, which are initially empty. The effect of the feedback inputs 1130 and 1132 will be described later herein. The average block 1128 outputs an average taken between the separated codeword 1124 and the feedback input 1132.

The averaged outputs of block 1126 are received by a distribution channel decoder 1134, which is configured to implement a reverse polarization stream network, configured in accordance with the training performed on the distribution channel encoder A (1114). Similarly, the averaged outputs of block 1128 are received by a distribution channel decoder 1136, which is configured to implement a reverse polarization stream network, configured in accordance with the training performed on the distribution channel encoder B (1116). The recovered features at the distribution channel decoders 1134 and 1136 are input to respective source decoders 1138 and 1140. The source decoder B (1138) will have been trained along with the source encoder A (1108) in a training exercise generally as described above in connection with FIG. 4. Similarly, the source decoder B (1140) will have been trained along with the source encoder A (1112) in a training exercise. The source decoder 1138 thus recovers the source information $S_M$, which acts as the reproduced output $S'_M$ at 1142. In this embodiment the feedback input 1132 to the average block 1128 is generated by a group of blocks 1144. The transform T of block 1110 is applied to the recovered source information $S_M$ to generate a 180° rotated copy of the recovered source information. The transformed source information is then output to a source encoder B, which in turn outputs extracted features of the source information to a distribution channel encoder B. The source encoder B and distribution channel encoder B have already been trained and configured as blocks 1112 and 1116. The output of the distribution channel encoder B provides the feedback input 1132 for the average block 1128.

The feedback input 1130 to the average block 1128 is generated by a group of blocks 1146. The transform T of block 1110 is inverted as $T^{-1}$. The transform $T^{-1}$ is applied to the source information, recovered at the output of the source decoder 1140, to generate a copy of the original source information $S_M$. The transformed source information is then output to a source encoder A, which in turn outputs extracted features of the source information to a distribution channel encoder A. The source encoder A and distribution channel encoder A have already been trained and configured as blocks 1108 and 1114. The output of the distribution channel encoder A provides the feedback input 1130 for the average block 1126.

Configuration information for the source encoders 1108 and 1112 and the distribution channel encoders 1114 and 1116 may be generated by the transmitter 1102 and transmitted to the receiver 1106 as described above in connection FIGS. 4 and 7. Alternatively, the receiver may select a trained configuration from the configuration information storage location (shown in FIG. 10 at 1002) for the distribution channel encoders 1114 and 1116. In a first iteration, the receiver 1106 decodes the separated codewords representing $S_M$ and $S_M T$, and provides an initial regenerated output at 1142. As disclosed above, during a first iteration the feedback inputs 1130 and 1132 are empty and the averages at blocks 1126 and 1128 are based only on the respective inputs 1122 and 1124. In second and subsequent iterations, the feedback generated by the blocks 1144 and 1146 is averaged with the respected received codewords at the blocks 1126 and 1128 and new regenerated outputs are produced. The regenerated output 1142 is compared to the transformed output 1148 to determine whether sufficient iterations have been performed. In practice, a number of iterations may be set to a pre-determined number determined based on a permissible time delay (for example 6 iterations). After 6 iterations, the regenerated output 1142 is compared to the transformed output 1148 to determine whether these outputs are sufficiently similar to terminate iteration.

The embodiment shown in FIG. 11 thus exploits a natural geometric property of the source information to reduce the effect of noise in the transmission channel 1104.

In general, although the present disclosure describes examples with reference to DNNs, for implementing the source encoder and source decoder, any suitable neural network architecture may be used. For example, a graph neural network (GNN) may a useful architecture for extracting features (or textures), because such a neural network may benefit from some a priori knowledge about the structure of the source information. A recurrent neural network (RNN) may also be a useful architecture for extracting features (or textures), because it may benefit from time correlation in the structure of the source information.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations, or equivalents that fall within the scope of the present invention.

What is claimed is:

1. A method for encoding source information for transmission over a transmission channel, the method comprising:

causing a source encoder to generate a plurality of feature probability distributions representing aspects of the source information;

receiving the plurality of feature probability distributions at an input of a distribution channel encoder, the distribution channel encoder being implemented using a polarization stream network; and causing the distribution channel encoder to transform the plurality of feature probability distributions into a dimension-extended output plurality of distribution codewords for transmission over the transmission channel.

2. The method of claim 1 wherein the source encoder comprises a source encoder neural network, and further comprising training the source encoder neural network to generate the plurality of feature probability distributions in response to receiving a source information training set.

3. The method of claim 2 wherein training the source encoder neural network comprises:

configuring a source decoder neural network to receive the plurality of feature probability distributions from the source encoder neural network at an input of the source decoder neural network; and training the source encoder neural network and source decoder neural network to reproduce the source information training set at an output of the source decoder neural network.

4. The method of claim 3 wherein training comprises training the source encoder neural network and source decoder neural network to satisfy:

a first target of maximizing likelihood between the output of the source decoder neural network and the source information training set; and a second target of minimizing relative entropy between the output of the source encoder neural network and a target distribution.

5. The method of claim 4 wherein the target distribution comprises a Gaussian distribution.

6. The method of claim 5 wherein the Gaussian distribution comprises a multi-dimensional Gaussian distribution and the feature probability distribution includes a vector of expectation values and variance values.

7. The method of claim 3 wherein the source encoder is implemented in a transmitter and further comprising transmitting configuration information to a receiver, the configuration information defining the source decoder neural network and facilitating configuration of a decoder at the receiver for decoding subsequent transmissions from the transmitter.

8. The method of claim 1 wherein each feature probability distribution includes an expectation value and a variance value.

9. The method of claim 1 further comprising training a neural network portion of the polarization stream network to configure the polarization stream network for performing the transformation between the feature probability distributions and output plurality of distribution codewords.

10. The method of claim 9 wherein the output plurality of distribution codewords comprises an output plurality of non-Gaussian distributions.

11. The method of claim 9 wherein the source encoder is configured to generate feature probability distributions having k dimensions and wherein the polarization stream network is configured to transform the k-dimensional feature probability distributions received at the input of the polarization stream network into an n-dimensional output plurality of distribution codewords, k being less than n, and wherein training the neural network portion of the polarization stream network comprises causing excess input dimensions of the polarization stream network to be held constant to generate the dimension-extended n-dimensional output plurality of distribution codewords.

12. The method of claim 11 wherein the distribution channel encoder is implemented in a transmitter and further comprising transmitting configuration information to a receiver, the configuration information including an identification of the excess input dimensions and information facilitating configuration of a reverse polarization stream network for implementing a decoder at the receiver.

13. The method of claim 9 wherein training the neural network portion of the polarization stream network comprises causing a receiver to train a plurality of polarization stream network configurations and further comprising receiving one of the plurality of polarization stream network configurations at the transmitter for performing the transformation between the feature probability distributions and output plurality of distribution codewords.

14. The method of claim 1, further comprising:
  receiving the plurality of distributions representing the transmitted source information at an input of a distribution channel decoder of a receiver, the distribution channel decoder being implemented using a polarization stream network;
  causing the distribution channel decoder to transform the plurality of distributions into a dimension-reduced output plurality of feature distributions; and
  causing a source decoder to regenerate the source information from the output plurality of feature probability distributions.

15. The method of claim 14 further comprising:
  receiving the first plurality of distributions representing the source information at an input of a first distribution channel decoder, the first distribution channel decoder being implemented using a polarization stream network;
  causing the first distribution channel decoder to transform the plurality of distributions into a dimension-reduced output plurality of feature distributions;
  causing a first source decoder to regenerate the source information from the output plurality of feature probability distributions;
  receiving a second plurality of distributions representing transformed source information at an input of a second distribution channel decoder, the second distribution channel decoder being implemented using a polarization stream network;
  causing the second distribution channel decoder to transform the second plurality of distributions into a dimension-reduced output plurality of feature distributions;
  causing a second source decoder to regenerate the transformed source information from the output plurality of feature probability distributions; and
  performing an iterative cancellation based on the regenerated source information and the transformed source information to generate a refined regeneration of the source information.

16. A method for encoding source information for transmission over a transmission channel, the method comprising:
  causing a first source encoder to generate a first plurality of feature probability distributions representing aspects of the source information;
  rearranging the source information to generate transformed source information; and
  causing a second source encoder to generate a second plurality of feature probability distributions representing aspects of the transformed source information;
  causing a first distribution channel encoder to transform the first plurality of feature probability distributions into a first dimension-extended output plurality of distribution codewords for transmission over the transmission channel; and
  causing a second distribution channel encoder to transform the second plurality of feature probability distributions into a second dimension-extended output plurality of distribution codewords for transmission over the transmission channel.

17. An encoder apparatus for encoding source information for transmission over a transmission channel, the apparatus comprising:
  a source encoder configured to generate a plurality of feature probability distributions representing aspects of the source information; and
  a distribution channel encoder having an input for receiving the plurality of feature probability distributions, the distribution channel encoder being implemented using a polarization stream network, the distribution channel encoder being configured to transform the plurality of feature probability distributions into a dimension-extended output plurality of distribution codewords for transmission over the transmission channel.

18. The apparatus of claim 17 wherein the encoder apparatus is implemented within a transmitter configured to transmit configuration information to a receiver, the configuration information facilitating configuration of a polarization stream network of the receiver for decoding subsequent transmissions from the transmitter.

19. The apparatus of claim 18 wherein the transmitter is associated with a sensor that generates the source information, the encoder apparatus being operably configured to encode the source information for transmission to the receiver.

* * * * *